Oct. 29, 1963           R. E. ASHBY           3,108,573
POULTRY WATERER VALVE AND TROUGH BRACKET COMBINED
Filed Feb. 28, 1962           3 Sheets-Sheet 1
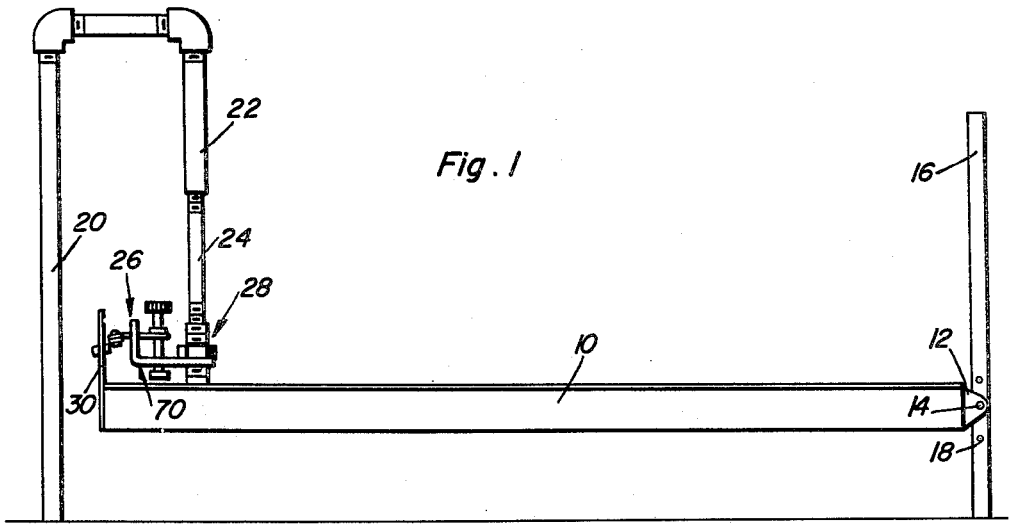
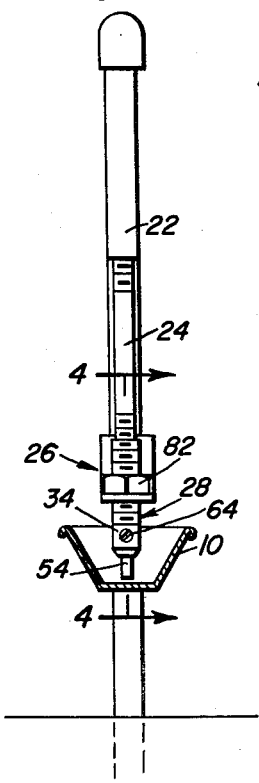
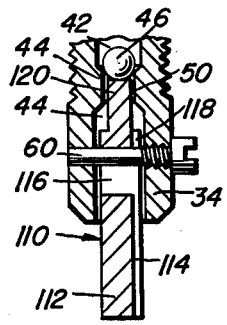
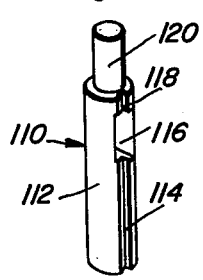
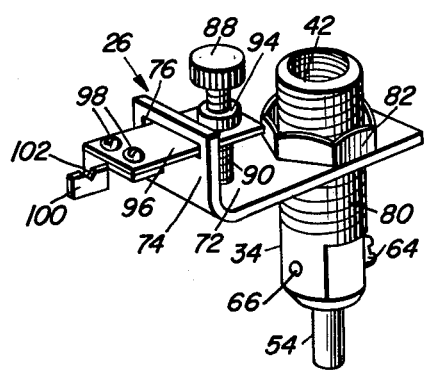
Ralph E. Ashby
INVENTOR.
BY *Clarence A. O'Brien*
*and Harvey B. Jacobson*
                    Attorneys Oct. 29, 1963  R. E. ASHBY  3,108,573
POULTRY WATERER VALVE AND TROUGH BRACKET COMBINED
Filed Feb. 28, 1962  3 Sheets-Sheet 2
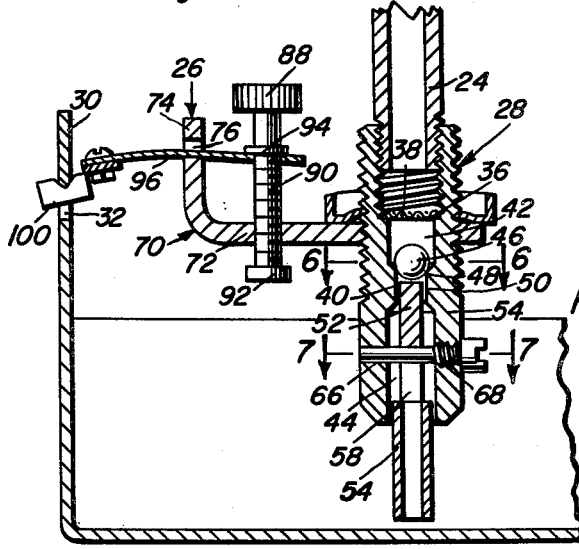
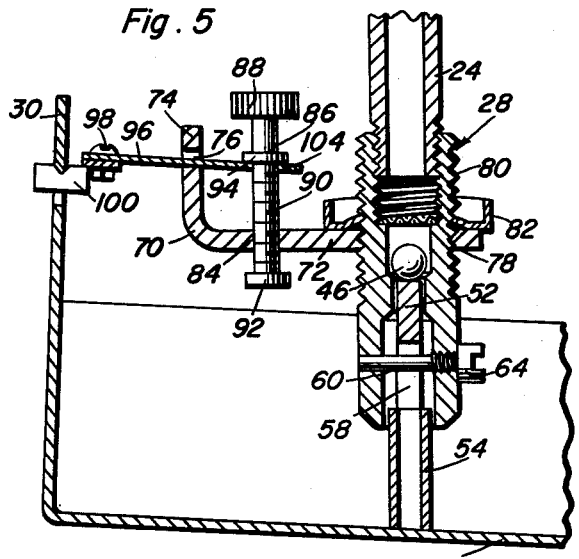
Ralph E. Ashby
INVENTOR.

Oct. 29, 1963  R. E. ASHBY  3,108,573
POULTRY WATERER VALVE AND TROUGH BRACKET COMBINED
Filed Feb. 28, 1962  3 Sheets-Sheet 3
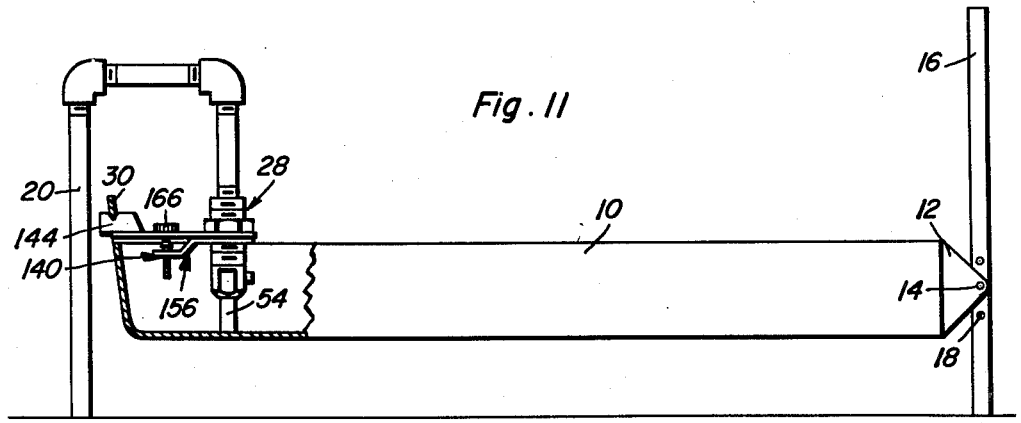
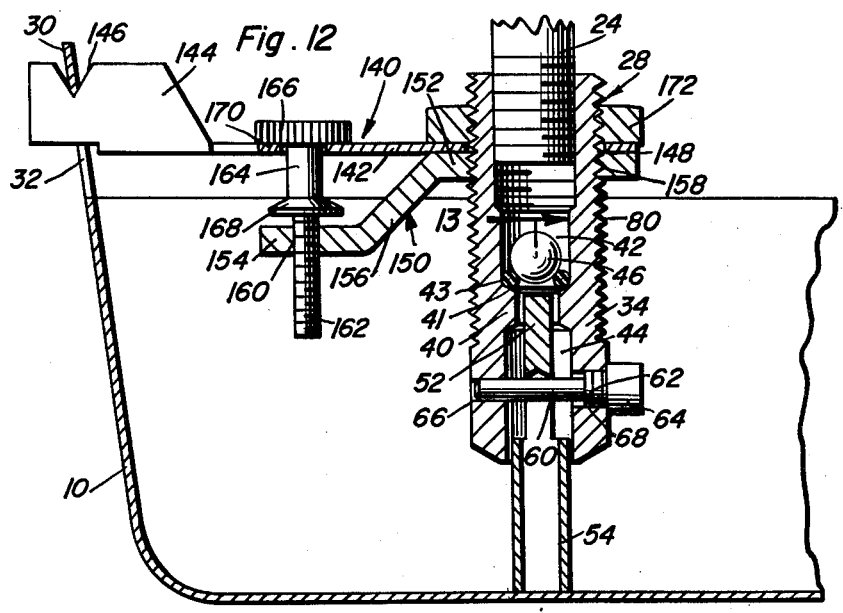
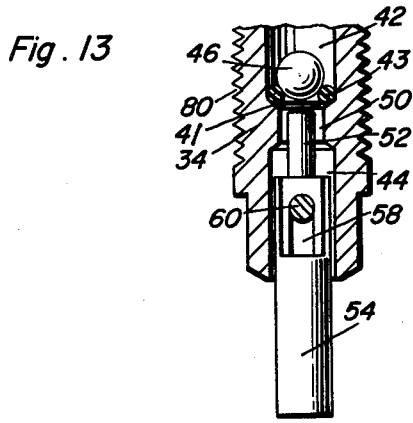
Ralph E. Ashby
INVENTOR.

3,108,573
POULTRY WATERER VALVE AND TROUGH
BRACKET COMBINED
Ralph E. Ashby, P.O. Box 52, Downsville, La.
Filed Feb. 28, 1962, Ser. No. 176,398
21 Claims. (Cl. 119—81)

This invention comprises a novel and useful poultry waterer valve and trough bracket combined and more particularly pertains to a watering device for automatically maintaining a constant supply of water available for poultry or other use.

Watering devices for poultry and other purposes are already well known and available of the type in which a pan is movably supported at one end for vertical movement relative to a support adjacent another end and wherein the relative movement of the pan is utilized to control the automatic supply of water thereto whereby to maintain a substantially constant volume of water or water level therein. It is to this particular type of watering device that the present invention relates and for which it provides a novel and improved mechanism.

It is the primary purpose of this invention to provide a device which will automatically maintain a constant weight, and for all practical purposes a constant level of water in a vertically movable water pan or trough.

A further object of the invention is to provide in a watering device of the type having a trough movably supported at one end and having a movable support connected to the other end thereof for effecting vertical movement of the trough, a means responsive to such vertical movement for automatically controlling a water inlet valve to the trough or pan and which will thereby maintain a constant weight and accordingly a constant level of water in the pan.

A further object of the invention is to provide a device in accordance with the preceding objects wherein the movable support means of the trough is directly carried by and is supported entirely by one end of a water inlet or water supply pipe.

A further object of the invention is to provide a device as set forth in the preceding objects wherein the water control valve has its control and operating means disposed entirely within the confines of the pan and directly operable by engagement with a portion of the pan during vertical movement of the latter.

A still further object of the invention is to provide a device in accordance with the preceding objects which will enable easy and sensitive adjustment of the vertical movement of the pan whereby to accurately regulate the quantity and level of water retained in the pan.

A still further object of the invention is to provide a device as set forth in the preceding objects which shall be exceedingly simple in construction, of relatively few parts and yet highly efficient in its operation.

Yet another purpose of the invention is to provide a device in accordance with the foregoing objects wherein the movable support of the pan shall consist of a leaf spring operably and adjustably connected to the valve mechanism and the inlet pipe and further connected in a removable manner to the pan itself.

Watering devices of this nature, in normal usage, are unavoidably subjected to severe weathering condition and to the pressure of dirt and foreign matter which inevitably result in excessive wear of the valve and its valve seat. This wear interferes with the desired automatic operation of the device. It is therefore a very important object to provide a water supply valve and a valve operator therefore of a unit construction which will materially reduce wear of the valve and valve seat and failure of the valve in its function and will facilitate ready removal and installation of the valve operator and/or valve for servicing or replacement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing a preferred manner in which a watering pan is movably mounted together with the means in accordance with this invention for controlling the supply of water thereinto;

FIGURE 2 is a view in vertical transverse section through a portion of the pan and showing in elevation upon an enlarged scale the water inlet pipe and the valve mechanism associated therewith;

FIGURE 3 is a perspective view upon an enlarged scale of the movable support means and valve assembly forming the subject matter of a preferred form of the present invention;

FIGURE 4 is a view in vertical transverse section taken substantially upon the plane indicated by the section line 4—4 of FIGURE 2 and upon an enlarged scale and showing upon an enlarged scale the manner in which the movable support of the present invention is operatively connected to the vertically movable pan and the water inlet pipe, the parts being shown in the position in which the pan has a predetermined quantity of water therein and the valve is in closed position;

FIGURE 5 is an enlarged view similar to FIGURE 4 but showing the position of the parts when the pan has an insufficient supply of water therein and the pan has moved vertically upward and opened the inlet valve for replenishing the water supply thereinto;

FIGURES 6 and 7 are horizontal sectional detail views taken substantially upon the planes indicated by the section lines 6—6 and 7—7 respectively of FIGURE 4;

FIGURE 8 is an exploded perspective view of the components of the control valve of this form of the invention;

FIGURE 9 is an enlarged detail view of a slightly modified construction of a valve operator which may be used by this form of the invention;

FIGURE 10 is a perspective view of the valve operator of FIGURE 9;

FIGURE 11 is a view similar to FIGURE 1 but with parts broken away and showing a further modified movable mounting or support means for the watering pan;

FIGURE 12 is a detail view of FIGURE 11, being taken upon an enlarged scale and showing in vertical transverse section the structure of the control valve mechanism and the association of the latter with the pan, the valve being shown in its closed position; and, FIGURE 13 is a detail view taken substantially upon the plane indicated by the section line 13—13 of FIGURE 12 but with the pan or trough being omitted and showing further details of the valve operator of FIGURE 12.

The invention set forth and claimed hereinafter constitutes a watering device similar in construction to and constituting an improvement over that disclosed in my prior co-pending application Serial No. 787,170, filed January 16, 1959, for "Automatic Poultry Waterer Valve," and which has matured into Patent No. 3,023,733 of March 6, 1962.

Attention is first directed to FIGURES 1, 4, 5 and FIGURES 11 and 12 which show two preferred forms of the invention. In these two forms the general arrangement is the same and the watering device includes a pan 10 of any desired character which at one end 12 thereof is secured as by a pivot pin 14 to a fixed support 16 in a selected one of a series of vertically spaced apertures 18 therein. Thus, this end portion of the pan can be movably or adjustably mounted at various vertical distances from the ground by means of the fixed support 16. At the other end of the pan there is provided a water supply means in the form of a pipe 20 having a downwardly extending portion 22 overlying the pan and from which portion depends a nipple 24 to the lower end of which is secured the movable mounting and support means of the present invention indicated generally by the numeral 26. This movable support means is connected to and carried by a valve assembly indicated generally by the numeral 28 which is secured to the lower end of the nipple 24 and thus depends therefrom into the interior of the pan.

The pan itself includes an upstanding plate 30 having an aperture 32 therethrough by means of which the supporting and mounting means 26 is detachably connected to the pan. As so far described, in both forms of the invention, the pan is thus movably mounted at one end 12 and is provided with a movable support and mount means 26 adjacent its other end for effecting vertical movement of the pan. This vertical movement is relied upon as set forth hereinafter in order to control the operation of the valve assembly 28 and thus automatically maintain a constant weight of water in the pan with a resultant constant water level therein. In this form of the invention as will be apparent hereinafter, the valve assembly 28 is provided with a depending valve actuator which in turn is directly engaged by and operated by a portion of the pan 10 during vertical movement of the latter.

Referring now specifically to FIGURES 4 and 5, it will be observed that the valve assembly 28 comprises a hollow or tubular valve body 34 whose upper end is both internally and externally threaded. The internal threads are engaged upon and embrace the lower end of the nipple 24, while the external threads serve to adjustably mount thereon as set forth hereinafter the supporting and mount means 26.

The valve body 34 is open throughout its extent and at its upper portion is provided with an annular shoulder 36 upon which is removably secured a screen or strainer 38 of any desired character.

Intermediate its ends the body is provided with a radially inwardly projecting annular rib or diametrically reduced portion 40 which provides a constriction between the upper and lower portions of the body and divides the interior of the latter into an upper chamber 42 comprising a valve chamber and a lower chamber 44 comprising a valve actuator chamber. Movably received in the upper chamber is a non-return valve of any suitable type such as a ball valve 46 which cooperates with a valve seat 48 formed upon the annular rib 40 at the upper end thereof and which faces into the valve chamber 42. Indicated at 50 is the passage extending through the annular rib 40 below the valve seat 48 and which provides a constant communication between the chambers 42 and 44 except when the valve is closed upon its seat. The bore or passage 50 constitutes a guide channel in which is received the upper end 52 of the valve operator 54. The latter, as will be best seen from FIGURE 8, consists of a cylindrical body which is hollow throughout its length except for the diametrically reduced cylindrical axial projection 52 at the upper end thereof. Between the main portion of the body 54 and the projection 52 the body is cut away to provide flat surfaces 56 on opposite sides thereof and an opening 58 extends through the body connecting these surfaces and also communicates with the interior of the cylindrical or tubular main portion 54.

It will be noted from FIGURES 4 and 5 that the valve operator has its lower main portion 54 loosely but guidingly retained in the lower chamber 44 for movement therethrough, with the upper portion 52 being loosely and guidingly retained in the bore 50 of the annular rib 40 below the valve seat. A retaining pin 60 having a threaded portion 62 and an enlarged head 64 at one end is removably received in the slotted portion 58 of the operator to retain the latter in assembled relation inside the valve body, this pin being seated in aligned bores 66 and 68 on opposite sides of the body with the bore 68 being also threaded to receive the threaded portion 62 of the pin.

The arrangement is such that by virtue of the loose fit of the portions 52 and 54 in the bore 50 and the chamber 44, that there is ample clearance for passage of water downwardly from the valve and also to wash upwardly from the bottom of the valve body. Thus ready flow of water into the pan is afforded while the valve parts are maintained clean by this agitating and washing action of the water from beneath.

The length of the operator is so proportioned that as shown in FIGURE 4, with the pan in a sufficiently lowered position, the valve 46 may seat upon its seat 48 with the upper end 52 of the operator being out of contact therewith, while the upper end of the slot 58 will be supported upon the retaining pin 60 and with the open lower end of the body portion 54 of the operator being disposed above the bottom wall of the pan or some other valve operating projection which may be provided within the pan.

However, when the quantity of water within the pan is sufficiently depleted so that the appropriate weight for which the device is calibrated or adjusted is not present, the pan will be lifted upwardly as to the tilt position shown in FIGURE 5. This upward movement will in turn cause the bottom of the pan or the other projection provided in the pan for that purpose to engage the bottom of the operator portion 54 and lift the latter causing the top portion 52 thereof to in turn lift the valve from its seat. Thus flow of water from the pipe and the nipple 24 to replenish the deficient supply in the pan is effected. It will be observed that the pressure of the water in the pipe 20 will further assist in retaining the valve upon its seat and thus tend to reduce any leakage through the valve assembly.

Reference is now made to FIGURES 3, 4 and 5 for a better understanding of the structure, arrangement and operation of the mounting and support means 26.

The supporting and mounting assembly 26 comprises a combined support bracket and fulcrum indicated generally by the numeral 70. This may conveniently consist of a single piece of sheet material including a horizontal plate-like portion 72 with an upstanding arm 74 which latter is slotted or apertured as at 76. The horizontal portion 72 is likewise apertured as at 78 and may be internally threaded if desired for engagement upon the external threads 80 which extend throughout the major upper portion of the length of the valve body so that the bracket and fulcrum 70 may be vertically adjusted upon the valve assembly in a convenient manner. A cap in the form of a locking washer 82 is likewise threaded upon the portion 80 to act as a locknut and maintain the bracket in its desired adjusted relation. It will be appreciated, however, that the aperture 78 of the portion 72 of the bracket may be loosely engaged upon the valve body and a further locknut may be threaded on the body portion 80 to adjustably lock and clamp the bracket in adjusted position.

The bracket is further provided in its horizontal portion 72 with an internally threaded bore 84 therethrough. Received in this bore is an adjusting screw 86 having a finger grip portion 88 together with an externally threaded stem portion 90 engaged in the bore 84 and further provided with an enlarged lower extremity 92. Intermediate its ends this member is provided with an annular collar 94. A laterally resilient lever 96 which is conveniently in the form of a leaf spring is extended through the slot 76 which thus constitutes a fulcrum for this lever. At one end this spring has secured thereto as by a fastener 98 a plate-like member 100 having a V-shaped recess 102 in its upper edge which is adapted to engage in the notch 32 and thus retain the upper edge of the latter therein as will be apparent from FIGURES 4 and 5. At its other end, the leaf spring 96 has a further aperture 104 therethrough through which is loosely received the externally threaded portion 90 of the stem of the adjusting screw. The leaf spring extremity bears against the underside of the collar 94 so as the screw is threaded downwardly in the support bracket arm 72, the tension upon the spring may be increased. By this means, an adjustable lifting force may be applied to the movable end of the pan in order to vary the force required to move the pan downwardly. Thus, by adjusting the tension upon the leaf spring, the quantity of water and thus the water level required in the pan in order to effect opening of the valve will be varied.

It should be noted that although the fixed support 14 of the pan has been shown as disposed at one end thereof, that both the relatively fixed support and a movable support may be positioned at any other desired location upon the pan as may be found expedient.

Referring next to FIGURES 9 and 10 it will be observed that a slightly modified construction of the valve operator has been illustrated which may be used in exactly the same environment as that shown in FIGURES 3–5. In this form, the valve operator indicated generally by the numeral 110 consists of a lower solid plunger 112 of cylindrical configuration but having a longitudinally extending flow groove or channel 114 thereon. At its upper end, the solid portion is provided with a transverse slot 116 therethrough with which this groove or channel communicates, and it will be noted that the channel extends above this slot as indicated at 118 to communicate with the upper portion of the lower chamber 44 thereabove. The retaining pin 60 previously described is used in the same manner to extend through this slot and to retain the operator in place. The operation of this form of the invention is identical to that previously described since the diametrically reduced upper portion 120 of the operator moves through the communicating guide bore 50 of the annular rib 44 to effect unseating of the check valve 46 from its valve seat in the upper or valve chamber 42. When the valve is unseated the water can flow through the clearance provided between the reduced portion 120 of the operator and the bore 50, into the lower chamber 44, and thence by way of the passage 118 into the slot 116. From this slot the water can flow through the annular clearance provided between the plunger portion 112 and the lower chamber 44 and also through the flow channel 114 into the pan.

Attention is now directed to the embodiment of the invention disclosed in FIGURES 11–13. The same numerals in these figures disclose those parts which are identical with corresponding elements of the preceding form. The valve structure of the valve assembly 28 is identical with that previously described in that the internal annular rib 40 contains the guide bore 50 therethrough, and separates the upper chamber 42 comprising the valve chamber from the lower or valve operator chamber 44. The valve operator may be of either of the two forms set forth in detail in the description regarding the previously described forms of the invention of FIGURES 1–10.

The upper surface of the internal rib 40 has a conical, tapering and upwardly divergent surface 41 upon which is seated an O-ring 43 which forms a resilient seat for the valve 46. This valve may be of either a rigid or a resilient material as desired and is of a diameter greater than the inside diameter of the O-ring or the inside diameter of the wall defining the valve chamber 42. The pressure of the water supplied by the nipple 24 into the chamber 42 is sufficient to maintain the valve seated firmly upon the O-ring 43.

The ball valve 46 is preferably of nylon although other materials such as rubber, other plastics or even steel may be employed in different instances.

Any of the previously described valve actuator constructions may be employed. As in each of the preceding forms, the diametrically reduced cylindrical upper end 52 of the actuator is of sufficient length to lie below the O-ring seat when the upper end of the slot 58 rests upon the stop and retainer pin 60 and the valve is seated; but will project upwardly through the valve seat 43 and lift the valve 46 from its seat when the actuator has been displaced upwardly and the actuator slot 58 has moved a sufficient distance upwardly upon the pin 60.

This upper end 52 is considerably longer than the length of the bore 50 and is of sufficiently less diameter than that of both the bore 50 and the opening in the O-ring 43 to provide an annular passageway between their respective surfaces by which water is discharged from the valve chamber 42 into the operator chamber 44. Similarly the diameter of the actuator 54 is sufficiently less than that of the lower chamber 44 to provide a second annular passageway through which water is discharged from the chamber 44 into the pan or trough.

The hollow interior of the operator 54 also freely communicates by means of the slot 58 with the lower chamber and by its open lower end further discharges into the pan or trough.

In all of the valve constructions set forth herein, ease of disassembly or assembly is effected by the readily removable retaining and stop pin 60 which enables the actuator to be easily withdrawn from the lower end of the housing 34. The valve 46 may then be readily unseated by inserting a slender tool upwardly in the chamber 44 to thereby flush any obstructions from the valve seat or bore.

However, a somewhat modified construction of the support and mounting means from that previously disclosed is employed. This form of the support and mounting means indicated generally by the numeral 140 likewise consists of a laterally flexible support lever 142 in the form of a leaf spring. This lever has one extremity bent upwardly to provide parallel upstanding side flanges or side walls 144 which are provided with a V-shaped notch 146 therein to receive the upper edge of the pan notch 32 in the projecting portion 30 of the pan. Similarly, at its other end the leaf spring 142 is provided with an aperture 148 therethrough for loose reception upon the external threaded portion 80 of the valve body 34. A combined bracket and fulcrum means indicated generally by the numeral 150 is used for providing a fulcrum for the leaf spring, an anchoring means for the leaf spring, and as an adjusting means for the latter. Thus, the mounting bracket 150 is of one-piece plate-like construction having a pair of palallel flat laterally offset extremities as at 152 and 154 connected by an angulated web 156 therebetween. The extremity 152 is provided with a bore 158 therethrough which is loosely received upon the valve body 34 as shown while the portion 154 is provided with an internally threaded bore 160 therethrough for the reception of the externally threaded end portion 162 of the adjustable screw fastener 164 having a headed extremity 166 together with a collar or flange 168. The upper stem portion of the fastener 164 is received through an aperture 170 provided in the leaf spring so that this leaf spring is relatively movable between the headed portion 166 and the flange 168. Obviously by adjusting the screw fastener downwardly in the bracket, the leaf spring will be deflected downwardly thus limiting its upward travel or displacement.

A suitable locknut as at 172 is engaged upon the threaded portion 80 of the valve body and cooperates with the bracket portion 150 to securely clamp the end of the leaf spring thereto.

It will thus be apparent that by adjusting the portion 152 and the nut 172 upwardly or downwardly upon the valve body 34, the vertical position of the resilient support lever 142 and thus of the pan 10 can be readily adjusted. Further, the operation of the screw fastener 164 will serve to vary the tension of the leaf spring. It will be observed that the fulcrum of the leaf spring in this form of the invention is provided at the adjacent edge of the bracket portions 152 and 154.

In this form of the invention the fulcrum is disposed at one end of the leaf spring and the connection to the pan at the other, with the spring adjusting means being intermediate thereof, while in the form of FIGURES 1–10, the fulcrum is between the adjusting means and the attachment of the spring to the pan. Further, in the form of FIGURES 11–13, the spring is itself fixedly secured to the valve body whereas in the preceding form of the invention the spring is secured by an adjustable supporting structure formed by the adjusting screw 86.

The foregoing is considered as illustrative only of the principles of the invention. Further, since numerous modifications and change will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatically maintained constant supply watering device comprising a water pan, means movably supporting said pan on one portion thereof, a water supply means disposed for delivering water into said pan, resilient support means connected to another portion of said pan for vertical movement thereof, a valve associated with said water supply means controlling flow of water into said pan, said valve including a hollow barrel extending into said pan, a valve seat in said barrel intermediate the ends thereof, a valve movably disposed in said barrel cooperating with said seat for controlling flow through said seat and barrel and gravity actuated towards a seat engaging and closing position, a valve operator having a first portion movably disposed in said barrel and cooperating with said valve for effecting disengagement of said valve from said seat and means including a second portion of said operator actuated in response to said vertical movement of said pan for intermittently effecting opening and closing of said seat by said valve, said resilient support means comprising an elongated laterally resilient and horizontally extending member, means supporting said pan at said other portion upon said member, fastening means securing said member fixedly to said barrel.

2. The combination of claim 1 wherein said resilient member comprises a leaf spring, means detachably connecting said leaf spring to said pan.

3. The combination of claim 1 wherein said resilient member comprises a leaf spring, means connected to said leaf spring and to said barrel for adjustably varying the tension of said leaf spring.

4. The combination of claim 1 wherein said resilient member comprises a leaf spring, means connected to said leaf spring and to said barrel for adjustably varying the tension of said leaf spring, said last mentioned means comprising a bracket mounted upon said body and comprising both an anchor and a fulcrum for said leaf spring.

5. The combination of claim 1 wherein said resilient member comprises a leaf spring, means connected to said leaf spring and to said barrel for adjustably varying the tension of said leaf spring, said last mentioned means comprising a bracket mounted upon said body and comprising both an anchor and a fulcrum for said leaf spring, said bracket having a slot therein through which said leaf spring extends to provide said fulcrum.

6. The combination of claim 1 wherein said resilient member comprises a leaf spring, means connected to said leaf spring and to said barrel for adjustably varying the tension of said leaf spring, said last mentioned means comprising a bracket mounted upon said body and comprising both an anchor and a fulcrum for said leaf spring, said leaf spring being directly secured to said barrel.

7. The combination of claim 1 wherein said resilient member comprises a leaf spring, means connected to said leaf spring and to said barrel for adjustably varying the tension of said leaf spring, said last mentioned means comprising a bracket mounted upon said body and comprising both an anchor and a fulcrum for said leaf spring, said bracket having a flat surface to which said leaf spring is clamped to form said fulcrum.

8. The combination of claim 1 wherein said resilient member comprises a leaf spring, means connected to said leaf spring and to said barrel for adjustably varying the tension of said leaf spring, said adjusting means comprising a fastening member threadedly attached to said bracket and extending through and connected to said leaf spring for adjustably laterally flexing and tensioning the latter.

9. The combination of claim 1 wherein said resilient member comprises a leaf spring, means connected to said leaf spring and to said barrel for adjustably varying the tension of said leaf spring, said adjusting means comprising a fastening member threadedly attached to said bracket and extending through and connected to said leaf spring for adjustably laterally flexing and tensioning the latter, said fastening member engaging one end of said spring.

10. The combination of claim 1 wherein said resilient member comprises a leaf spring, means connected to said leaf spring and to said barrel for adjustably varying the tension of said leaf spring, said adjusting means comprising a fastening member threadedly attached to said bracket and extending through and connected to said leaf spring for adjustably laterally flexing and tensioning the latter, said fastening member engaging a mid-portion of said spring.

11. The combination of claim 1 wherein said barrel includes an externally threaded portion, said resilient support means comprising a bracket having an opening by which the bracket is mounted upon said barrel, said fastening means engaging said threaded portion for locking said bracket in adjusted position upon said barrel.

12. A constant supply watering device comprising a water pan, means movably supporting said pan adjacent one end portion thereof, resilient support means attached to another portion of said pan spaced from said movable supporting means and supporting said pan for vertical movement in proportion to the weight of water therein, water supply means positioned above said pan for discharging water thereinto and having a vertically extending valve assembly controlling flow of water into said pan, said resilient support means being fixedly mounted upon and projecting laterally from said valve assembly and being connected to said pan whereby to reduce the vertical height of said device, said valve assembly including a hollow barrel, a valve seat within said barrel intermediate the ends of the latter and dividing the interior of said barrel into upper and lower chambers, said water supply means communicating with said upper chamber, a valve in said upper chamber cooperating with said valve seat, a valve actuator movable in said lower chamber, said actuator having a lower end projecting from the lower end of said barrel and positioned for engagement and lifting in response to predetermined upward movement of said pan, an upper end of said actuator being disposed for movement upward from said lower chamber and through said valve seat for unseating said valve therefrom upon upward movement of said actuator.

13. The combination of claim 12 wherein at least one of said valve seat and valve are of resilient material.

14. The combination of claim 12 wherein said actuator comprises a cylindrical member whose upper and lower ends provide annular clearance between said valve seat and the wall of said lower chamber respectively for flow of water therepast.

15. The combination of claim 12 including a vertically elongated slot in said actuator, a retainer and stop pin releasably carried by said barrel and extending into said slot for limiting vertical travel of said actuator and for releasably retaining the latter in said barrel.

16. The combination of claim 15 wherein said actuator comprises a cylindrical member whose upper and lower ends provide annular clearance between said valve seat and the wall of said lower chamber respectively for flow of water therepast, said slot communicating with said lower chamber, said lower chamber being open at the lower end of said barrel, said lower end of said actuator having an axial bore communicating with said slot.

17. An automatically maintained constant supply watering device comprising a water pan, means movably supporting said pan on one portion thereof, a water supply means disposed for delivering water into said pan, resilient support means connected to another portion of said pan for vertical movement thereof, a valve associated with said water supply means controlling flow of water into said pan, said valve including a hollow barrel extending into said pan, a valve seat in said barrel intermediate the ends thereof, a valve movably disposed in said barrel cooperating with said seat for controlling flow through said seat and barrel and gravity actuated toward a seat engaging and closing position, a valve operator having a first portion movably disposed in said barrel and cooperating with said valve for effecting disengagement of said valve from said seat and means including a second portion of said operator actuated in response to said vertical movement of said pan for intermittently effecting opening and closing of said seat by said valve, said resilient support means comprising a rigid horizontally extending support bracket fixedly mounted upon said barrel and projecting laterally therefrom, a horizontal, vertically flexible member mounted upon said bracket and having an end portion projecting horizontally and laterally beyond, means securing said member end portion to said pan.

18. The combination of claim 17 wherein said resilient support means is disposed between the upper and lower limits of said barrel.

19. The combination of claim 17 including adjusting means carried by said bracket and engaging said flexible member for adjustably deflecting the latter relative to said bracket whereby to vary the flexure strength of said member.

20. A valve assembly for use in a constant supply watering device of the type comprising a water pan, a water supply means positioned above said pan for delivering water thereinto, means supporting said pan at one portion thereof at a fixed vertical elevation, means resiliently supporting said pan at another portion thereof for adjustably vertically positioning said pan, said valve assembly being adapted to control flow through said supply means in response to vertical adjustment of said pan, said valve assembly comprising a barrel having upper and lower chambers adapted to respectively have continuous communication with said water supply means and said water pan, a valve seat in said barrel connecting said chambers, a valve in said upper chamber cooperating with said seat and gravity urged to said seat, a valve actuator in said lower chamber having a lower portion extending downwardly from the latter and engageable by said pan for vertical movement in said barrel, said actuator comprising a vertically elongated body having upper and lower portions, respectively engageable with said valve for unseating the latter and adapted for actuated engagement by said pan, said upper and lower portions being of such size as to enable free flow of water therepast in said upper and lower chambers respectively, said body having a vertically elongated slot therethrough, retaining means removably mounted on said barrel and extending through said lower chamber and slot and retaining said body in said barrel for limited, guided vertical movement.

21. The combination of claim 20 wherein said body includes cylindrical lower and upper portions of respectively large and small diameters, said lower portion adjacent said upper portion having flat, vertical cutaway side surfaces, said slot extending between said side surfaces.

References Cited in the file of this patent
UNITED STATES PATENTS

| | | |
|---|---|---|
| 682,779 | Bade | Sept. 17, 1901 |
| 2,626,631 | Hotton et al. | Jan. 27, 1953 |
| 2,817,355 | Goff | Dec. 24, 1957 |